April 2, 1968
F. J. RINK
3,376,502
APPARATUS HAVING STANDARD IMPEDANCE CALIBRATION MEANS
FOR TESTING THE IMPEDANCE OF AN ELECTRICAL
GROUND AND INCLUDING POLARITY
REVERSING SWITCH MEANS
Filed June 18, 1965
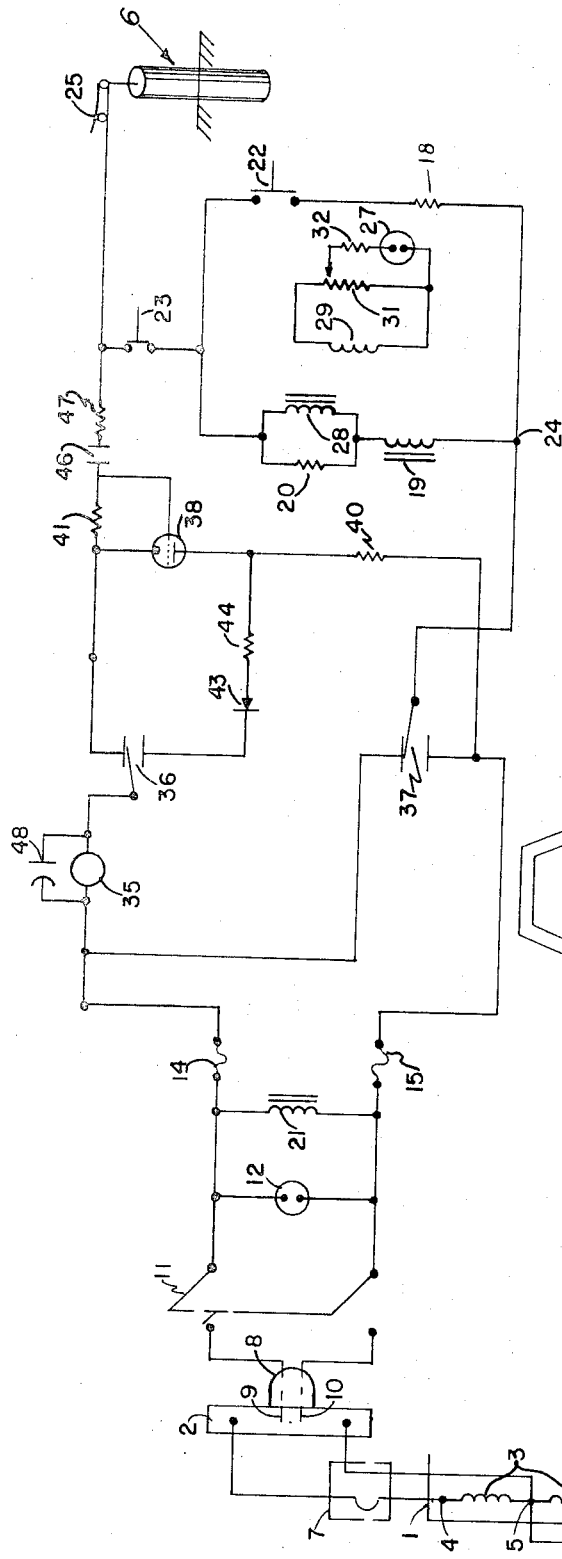
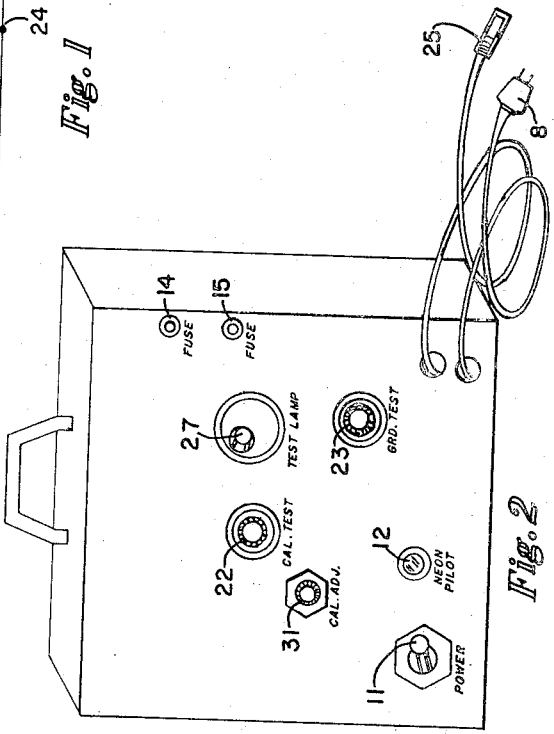
INVENTOR
*Frederick J. Rink*
BY
*Grew and Edwards*
Attorney

United States Patent Office 3,376,502
Patented Apr. 2, 1968

3,376,502
APPARATUS HAVING STANDARD IMPEDANCE CALIBRATION MEANS FOR TESTING THE IMPEDANCE OF AN ELECTRICAL GROUND AND INCLUDING POLARITY REVERSING SWITCH MEANS
Frederick J. Rink, 2811 Wilmete Lane, Littleton, Colo. 80120
Filed June 18, 1965, Ser. No. 465,109
4 Claims. (Cl. 324—51)

This invention relates generally to electrical testing and more particularly to electrical apparatus for testing the quality of an electrical ground.

Each electrical circuit to carry current must include at least one hot line and an electrical ground. In addition auxiliary metal equipment such as conduits, sheathed cables, switchboards, fuse cabinets, etc. preferably should include an electrical ground to avoid a shock hazard which might otherwise occur when an accidental contact is made with enclosures or connected appliances in the event a ground fault occurs. This electrical ground is commonly provided by a metal conductor having a portion in contact with the earth such as a water pipe, raceway, electrical wiring or the like. The value of such electrical ground in terms of protection against electrical shock and permitting the clearing of the system of grounded or partially grounded devices depends entirely upon the ability of such electrical ground to carry current without excessive voltage drop, i.e., to be effective an electrical ground must have a low impedance.

Currently available testers for testing an electrical ground consisting primarily of instruments of the ohmmeter or "Megger" type. Ohmmeters, however, commonly employ test currents in the range of 50 to 200 milliamperes and although such test current levels provide information as to the circuit impedance they do not assure that the circuit has the capability of carrying currents of medium to large magnitude. A fine strand of wire, for example, making a light contact with the conducting surface may have very low contact resistance as measured by ohmmeter but would be totally ineffective as a safe ground path. Accordingly, it is an object of this invention to provide electrical testing apparatus for checking the quality of an electrical ground under conditions approximately simulating actual electrical fault current conditions.

It is another object of my invention to provide a simple, durable, and reliable electrical tester for testing the impedance of an electrical ground.

It is a further object of my invention to provide a safe, durable, and easy-to-use electrical tester which provides a go/no go indication of ground quality for various types of electrical grounds.

Another object of my invention is to provide an electrical tester suitable for use with a standard convenience electrical outlet and will test the impedance of electrical ground regardless of the polarity of the convenience outlet.

Further objects and advantages of my invention will become apparent as the following description proceeds and the features of novelty which characterize my invention will be pointed out with particularity in the claims annexed to and forming part of the specification.

Briefly, in carrying out the objects of my invention and in one embodiment thereof I provide a standard resistor having an impedance value which is the maxium that may be tolerated in an electrical ground. I provide a comparator circuit for comparing the impedance of the standard resistor with the impedance of a test electrical ground at realistic current levels. I further provide a polarity circuit which connects the comparator circuitry to the ground of the power supply for referencing the impedance measurement thereto.

For better understanding of my invention reference may be had to the accompanying drawings in which:

FIG. 1 is a circuit diagram of an electrical tester embodying my invention, and

FIG. 2 is a front elevation view of a portable tester showing with particularity the face panel and embodying my invention.

Referring now to FIG. 1, the circuit diagram includes a power supply 1 which is a standard 120/240 volt A.C. three-wire system connected to a convenience outlet 2. Power supply 1 is shown as including a secondary transformer winding 3 grounded at the neutral 5 with a hot wire 4 and at about 120 volts potential. An electrical ground to be tested is generally indicated by numeral 6 and may be a raceway system, electrical wiring, piping system or the like. Branch circuit protection indicated by numeral 7 is shown in the line as a typical circuit breaker.

A standard two prong plug 8, having connectors 9 and 10, is provided for connecting the tester to a power supply 1 through an outlet 2. A power switch 11 connects across lines leading from the plug connectors 9 and 10.

A neon pilot lamp 12 is connected across the switch 11 to indicate when power supply 1 is connected to the test circuitry. Fuses 14 and 15 are preferably provided in each line for overload current protection.

The line voltage is stepped down by a transformer to about 12 volts for the test circuit, described below. Since an electrical ground is being tested, the polarity of the leads in the circuit is critical, the neutral of the power line must be in series with the test electrical ground. An automatic polarity circuit, described below, provided by the invention simplifies the use of the tester. However, manual means may be used to check polarity of the outlet connectors to insure proper positioning of the two prong plug 8.

The tester circuit includes a known or standard resistor 18. A test power circuit is provided which includes the secondary winding 19 of a step-down transformer connected in series with a resistor 20 of preselected value. The primary winding of the transformer is indicated at 21 and is connected across the switch 11 to be energized by power supply 1. It is understood that a separate transformer 21 or other electrical power supply would be suitable but for a portable instrument the use of power supply 1 as described above as the power for the test circuitry and the neutral ground is preferred.

A switch 22, preferably of the normally-open type and referred to as the calibration test switch, is connected in series with the test power circuit. An indicating means, preferably an on/off device such as an indicator or glow lamp 27 and referred to as the test lamp, is provided in the test power circuit. The primary winding 28 of a step-up transformer is connected across resistor 20. An adjustable potentiometer 31 is connected across the secondary winding 29 of the step-up transformer. The test lamp 27 is connected in series with a resistor 32 the combination of which is connected across the tap of the potentiometer 31 providing a variable voltage across the test lamp 27.

Closure of switch 22 electrically connects the combined impedance of resistors 18, 20 and transformer winding 28 with transformer winding 19 in series, and resistor 18 and transformer winding 19 are commonly connected at 24 to provide a closed loop so that the current flowing therein is directly proportional to the voltage across the transformer winding 19 and inversely proportional to the combined impedance of resistors 18, 20 and transformer winding 28. The impedance of resistor 20 is selected to limit the current flow to a suitable test current level in conjunction with transformer winding 28, and the impedance of resistor 18 is selected to provide a standard of impedance comparison with the test electrical ground. Preferably, the impedance of resistor 18 is the maximum allowable impedance that may be found in a safe electrical ground. With switch 22 closed, the adjustable potentiometer 31 is set at calibration test so that the current in this circuit will just barely cause lamp 27 to glow.

The opening of switch 22 and the closing of switch 23 electrically connects the test electrical ground 6 in series with the test power circuit. The current flow is directly proportional to the voltage across the transformer winding 19 and inversely proportional to the impedance of resistor 20 and the test electrical ground 6. If the impedance of the test electrical ground is equal to or lower than the standard resistor 18, the test lamp 27 will glow indicating the test electrical ground has a satisfactory impedance. If the impedance of the test electrical ground is larger than the standard resistor 18, then the test lamp 27 will not glow indicating the test electrical ground has an unsatisfactory impedance. In this manner a comparison of the impedances of the test electrical ground and the standard resistor 18 is made and significant current flow must be established before the test ground can be indicated as good.

The value of the voltage across transformer winding 19 and the impedance of resistors 18 and 20 is selected so that the test current is in excess of one ampere and preferably in the range of 4½ to 6½ amperes. This current level is representative of actual fault current levels for general purpose branch circuits and therefore provides a more reliable satisfactory ground comparison than heretofore possible in instruments having test current levels in the milliampere range.

In one preferred test circuit for conventional construction, some of the components will be transformer winding 21, 120 volts; transformer winding 19, 12 volts; resistor 20, 2 ohms; and resistor 18, 1 ohm.

A good electrical ground for conventional commercial and residential construction will have substantially less than one ohm impedance. Standard resistor 18 is preferably selected at one ohm to provide a reasonable impedance criteria and represent the maximum impedance which may be tolerated in a ground without producing excessive voltage drop.

The impedance comparison above described must be made with reference to suitable ground for complete accuracy. The grounded neutral 5 of the power supply 1 is most suitable particularly for portable instruments. However, difficulty is encountered in manually ascertaining which side of the convenience outlet 2 is connected to the grounded neutral 5. An automatic polarity switch circuit is provided for connecting the grounded neutral 5 to common connection 24 regardless of the connection of the power source transformer winding to the convenience outlet 2.

The polarity switch circuit includes a relay having coil 35 and contacts 36 and 37. Contacts 36 and 37 are shown in FIG. 1 in the position when coil 35 is de-energized.

With power switch 11 closed connectors 9 and 10 are selectively connected to common connection 24 through contact 37. In the de-energized position as shown in FIG. 1 connector 9 is connected through contact 37 to common connection 24. When connector 9 is connected through the convenience outlet 2 to grounded neutral 5 common connection 24 is connected to the grounded neutral 5.

A series circuit including coil 35, contact 36, vacuum tube 38, and resistor 40 is connected across switch 11 and thus across connectors 9 and 10 when switch 11 is closed. Tube 38 has a bias resistor 41 connected between the grid and cathode. A series capacitor 46 and resistor 47 are connected between the grid of tube 38 and the test clamp 25. A holding circuit comprising a diode 43 and resistor 44 serially connects between coil 35 and resistor 40 to hold the relay in the switched position. A capacitor 48 is connected across coil 35 to provide hold in current during the relay switching action. The impedance of resistors 40 and 44 are selected to provide suitable holding current for the relay.

Vacuum tube 38 is preferably a relay control tube and more specifically a grid controlled gas triode. Tube 38 is biased so that when the hot line 4 is connected to the emitter the tube conducts and when the hot line 4 is connected to the plate the tube does not conduct. Vacuum tube 38 with associated circuitry provides a switching action in the relay between the power supply 1 and clamp 25. This arrangement eliminates the shock sensation which would otherwise result from instantaneous A.C. when clamp 25 is disconnected from the test electrical ground and the relay returns to the de-energized position.

When connector 9 is connected through convenience outlet 2 to hot line 4, tube 38 conducts and coil 35 is energized switching contacts 36 and 37 oppositely of that shown in FIG. 1. In this position grounded neutral 5 connects through contact 37 to common connection 24 and coil 35, contact 36, diode 43, resistor 40 are connected in series across power source 1 to keep coil 35 energized. By using the neutral of the power supply 1 as the return path with the circuitry connected as described above, the flow of the test current is 180 degrees out of phase with the normal load current so that the voltage drop due to normal loads is cancelled by the test current.

A portable test instrument having a face panel and housing for the above described circuitry and embodying the present invention is illustrated in FIG. 2. Referring to the panel board the power switch 11, neon pilot lamp 12, fuses 14 and 15, calibration test switch 22, ground test switch 23, test lamp 27, and calibration adjust switch 31 are provided on the face of the panel board. Clamp 25 and plug 8 extend from suitable wiring from the face of the panel. Referring to FIG. 2 the preferred sequence of operation is as follows:

Ground test:
(1) Insert plug 8 into outlet 2 and turn on power switch 11.
(2) Connect the test clip 25 to the test electrical ground 6.
(3) Depress ground test switch 23.
(4) If test lamp 27 lights, ground is satisfactory.

Calibration check:
(1) With unit plugged in and power on, adjust calibration-adjust 31 until test lamp 27 barely glows when calibration test switch 22 is depressed.

From the foregoing the operation of the circuitry above described is believed clear. In general the tester apparatus compares the impedance of the test electrical ground to the impedance of a standard resistor using the techniques of reflection of impedance in order to achieve an indication of ground quality under conditions of substantial ground path current flow with a low test voltage. With the preferred circiut component selection, unless the impedance of the ground test electrode is one ohm or less, the tester will not acknowledge the test electrical ground as satisfactory. The impedance comparison is automatically referenced to the grounded neutral of the A.C. power supply regardless of the polarity of the convenience outlet. The circuitry is connected so as to provide flow of test current 180 degrees out of phase with the normal load current so that the voltage drop due to normal loads is cancelled by the test current.

Although there has been illustrated a specific embodiment of this invention, various modifications will occur to those skilled in the art. Therefore, it is not desired to limit the invention to the specific details illustrated and described but it is intended that the appended claims cover all modifications which fall within the spirit and scope of this invention.

I claim:
1. Electrical apparatus for testing the impedance of a test electrical ground comprising
an A.C. power supply having a grounded neutral, test circuit means connected to said power supply including,
indicator means, and means to apply current to said test circuit means connected in a series circuit arrangement,
a standard resistor connected across said series circuit arrangement,
said means to apply current to said test circuit means powered by connection to said A.C. power supply and said series circuit arrangement having one side connected to said grounded neutral and the other side connected to the test electrical ground,
switching means to complete the circuit connection to said standard resistor to calibrate said test circuit means and alternatively to connect said test electrical ground to said means to apply current and said indicator means while breaking the circiut connection to said standard resistor,
and additional polarity reversing switching means connected across said power supply to complete the connection of said grounded neutral to only one side of said means to apply current regardless of how said test circuit is connected to said grounded neutral of said A.C. power supply.

2. The electrical apparatus of claim 1 further characterized by
said indicator means including
a primary transformer winding connected in said series circuit arrangement,
a secondary transformer winding in operative relation to said primary transformer winding,
and an indicator connected to said secondary transformer winding.

3. The electrical apparatus of claim 1 further characterized by
said additional switching means including
relay and contact means which are connected across said power supply to complete the connection of said grounded neutral to only said one side of said means to apply current,
and relay control menas connected to said relay and contact means to set and hold the connection of said grounded neutral to said one side of said means to apply current.

4. The electrical apparatus of claim 3 further characterized by
said relay control menas being an electron tube in series with at least a portion of said contact means.

References Cited
UNITED STATES PATENTS

| | | | |
|---|---|---|---|
| 2,497,961 | 2/1950 | Shaw | 324—115 X |
| 2,689,939 | 9/1954 | Godshalk | 324—29.5 |
| 3,005,156 | 10/1961 | Hoberman | 324—115 |
| 3,176,219 | 3/1965 | Behr | |

RUDOLPH V. ROLINEC, *Primary Examiner.*

WALTER L. CARLSON, *Examiner.*

G. R. STRECKER, *Assistant Examiner.*